March 25, 1941.  M. S. KENNEDY  2,236,371
FILM ADAPTER
Filed Dec. 14, 1939  2 Sheets-Sheet 2
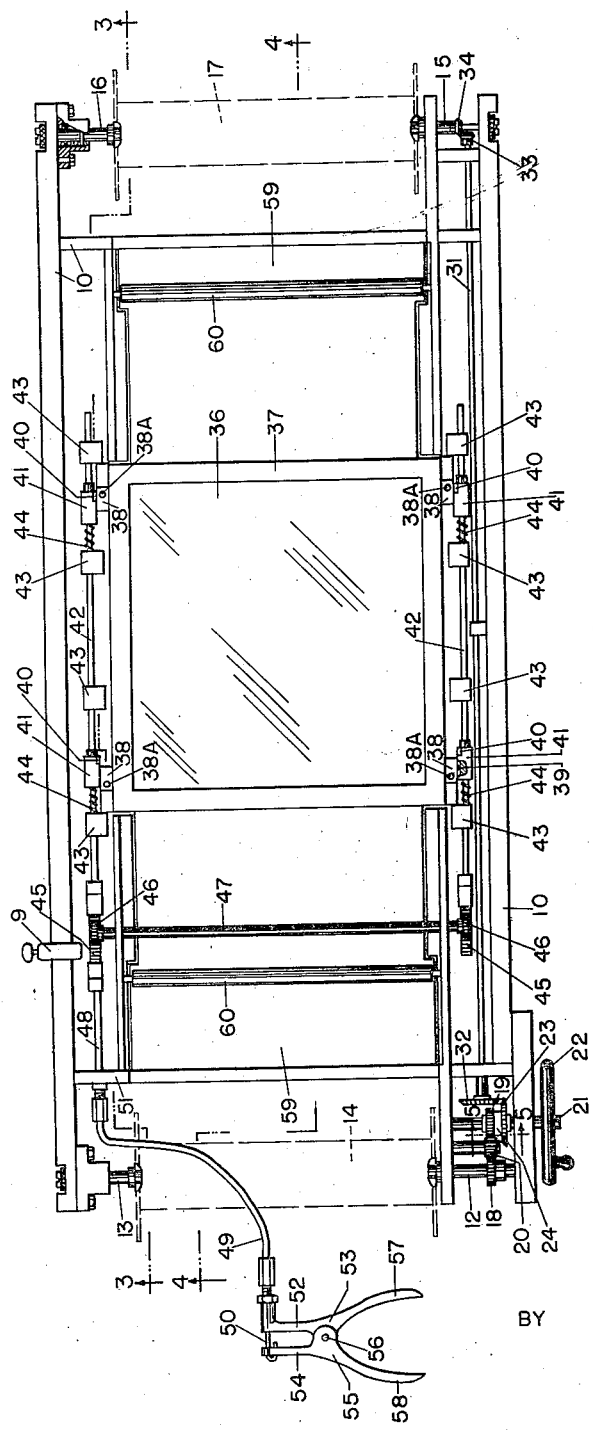
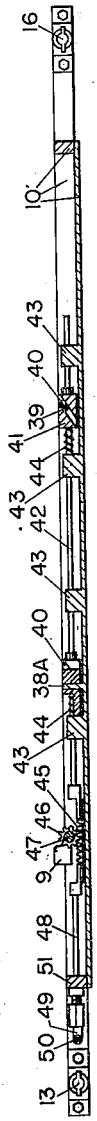
Fig. 2
Fig. 3
INVENTOR
Melvin S. Kennedy
BY
ATTORNEYS Patented Mar. 25, 1941

2,236,371

UNITED STATES PATENT OFFICE 2,236,371

FILM ADAPTER

Melvin S. Kennedy, Arlington, Va.; dedicated to the free use of the People in the territory of the United States Application December 14, 1939, Serial No. 309,278

3 Claims. (Cl. 88—28)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention relates to a device for holding film, either in roll form or cut form, in a projector camera. When the film used is in roll form, the device comprises means for feeding the film through the camera.

One of the objects of this invention is the provision of a device of the type mentioned which is attachable as a unit to a projector camera and which can be operated from the exterior of the camera without removing the device or in any way interfering with its fixed position in the camera.

Another object of this invention is the provision of a device which in operation does not mar or in any way damage the film, especially by scraping.

The following description, considered together with the accompanying drawings, will disclose this invention more fully, its construction, arrangements and operations of parts, and further objects and advantages thereof will be apparent.

In the drawings:

Figure 2 is a plan view of the device removed from the camera.

Figure 3 is a section along the line 3—3 of Figure 2.

Figure 4 is a section along the line 4—4 of Figure 2.

Figure 5 is a section along the line 5—5 of Figure 2.

Figure 1:
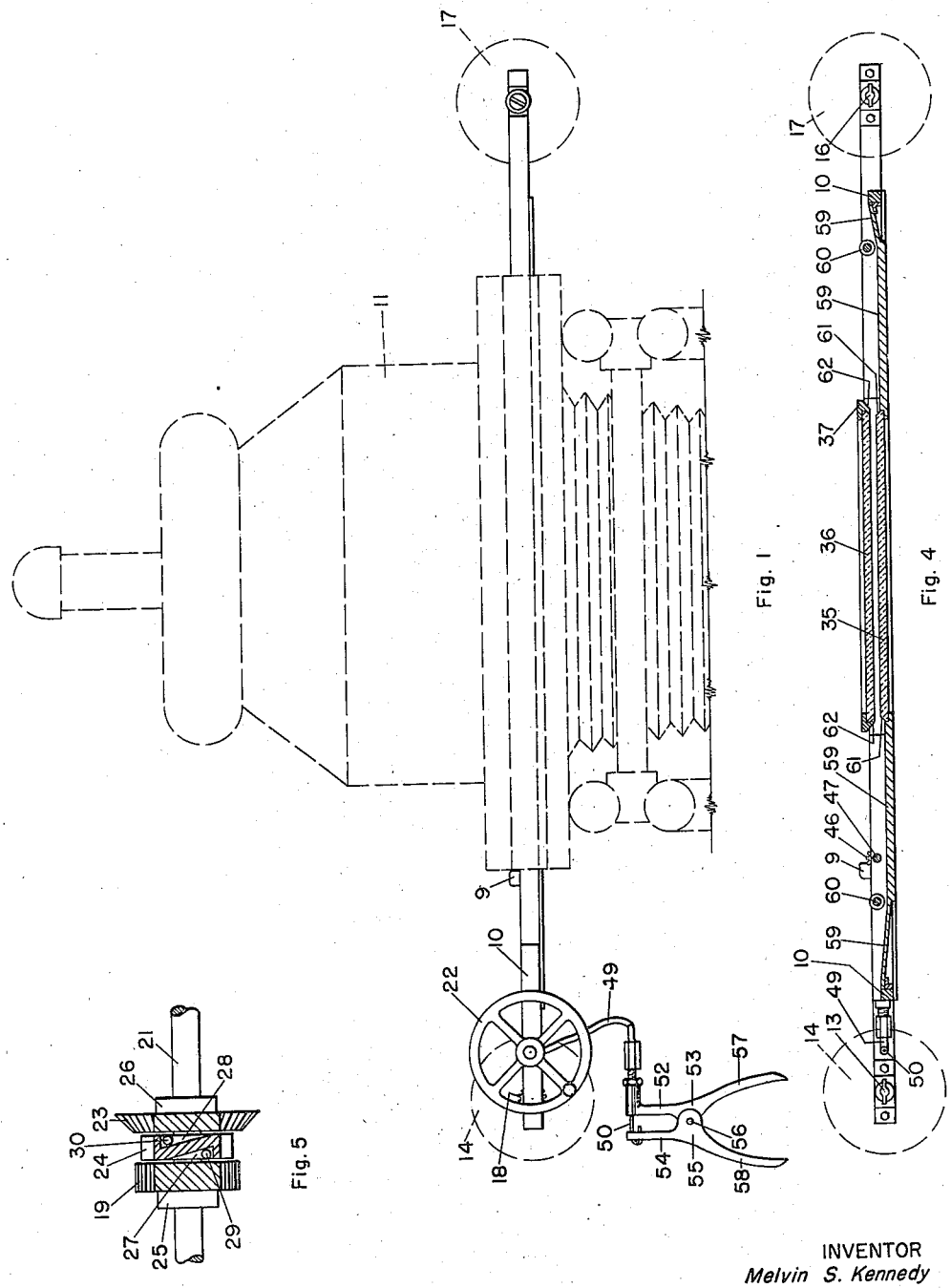
Figure 1 is a side elevational view of an embodiment of this invention shown mounted in a camera of the type mentioned, the camera being illustrated in broken or phantom lines.

Referring with more particularity to the drawings in which like numerals designate like parts, the device comprises suitable frame members indicated generally by the numeral 10 the middle section of which is adapted to fit into the camera projector 11 at the position usually reserved for the film, or what is hereinafter referred to as the film loading section of the camera. An adjustable shoulder clamp 9 is slidably mounted on one of the longitudinal frame members to abut the housing of the camera projector so that the device can be set to the proper operative position for any particular camera projector. At each end of the frame, means are provided for holding a film roll spool. At one end the means comprise a rotatable shaft 12 and an axially resiliently yieldable pin 13 of any type well known in the art. Between the shaft 12 and pin 13, the spool 14 (shown in dotted lines) is disposed. At the other end of the frame, a similar shaft 15 and pin 16 is provided for holding the spool 17. To the shaft 12 a gear 18 is fixed and engaged with another gear 19 through an idling gear 20. The gear 19 is rotatably mounted on a shaft 21 which in turn is rotatably mounted in suitable bearings on the frame of the device and extends outward to receive a hand wheel 22, to which it is fixed. Another gear 23 of the bevel type is coaxially mounted with the gear 19 for rotation on the shaft 21. A wide collar 24 is fixed to the shaft 21 between the gears 19 and 23, and additional collars 25 and 26 are fixed to the shaft 21 on the opposite sides of the gears 19 and 23, respectively, in such a manner that said gears are permitted to rotate freely on the shaft 21 with a small amount of axial play. In the faces of collar 24 wedge grooves 27 and 28, one on each side are provided normal to the radius, tapering in opposite directions tangentially. Within said grooves, balls 29 and 30, one ball for each groove, are provided so that when the shaft 21 is rotated in one direction, say clockwise, the ball 29 is forced against the gear 19 axially creating sufficient friction between the gear 19 and the collar 24 to drive said gear. When the shaft 21 is rotated in the opposite or counter clockwise direction, the same effect is produced between the gear 23 and collar 24 and since collar 24 now rotates in a direction opposite to the taper of the wedge groove 27, no engagement is encountered between this collar and the gear 19, the ball 29 simply idling in the groove 27.

A longitudinal shaft 31 having fixed to it a bevel gear 32 at one end engaging the bevel gear 23 is also provided. At the other end of the shaft 31 another bevel gear 33 is fixed, which meshes with a bevel gear 34 fixed to the shaft 15. By these means, the rotation of the hand wheel 22 in a clockwise direction forces the spool 17 to rotate clockwise keeping the spool 14 free, and when the hand wheel 22 is rotated in the opposite or counter-clockwise direction, the spool 14 is caused to rotate in a counter-clockwise direction, keeping the spool 17 free. Consequently, a roll of film wound on the spools 14 and 17 can be wound and unwound in either direction by simply manipulating the hand wheel 22.

At the middle section of the frame of the device there is disposed a pressure plate assembly comprising a glass or other suitable transparent plate 35 fixed to the frame, and directly above this plate there is disposed a similar plate 36, which latter plate is movable in a vertical direction with respect to the bottom plate 35. The top plate 36 is mounted in a suitable frame 37, to each side of which is secured a pair of blocks 38 slidably engaged with vertical pins 38A, said pins being fixed to or made integral with the frame of the device. Each of these blocks is provided with a stub pin 39 projecting laterally and engaging an inclined slot 40 disposed in the sides of blocks 41, which blocks slidably abut blocks 38 and hold the plate 36 in position laterally. On each side of the frame the blocks 41 are connected by means of a rod 42. The rods 42 are slidably disposed through bearing blocks 43 fixed to the frame 10, substantially as shown, and by means of springs 44, or other suitable means, are yieldably held in a position where the pins 39 are at their lowest elevation in their respective slots 40, thereby causing the plate 36 to rest upon the plate 35 as the normal position. The rods 42 are made coactive by means of rack extensions 45 engaging gears 46 at the ends of a transverse shaft 47, said shaft being rotatably mounted in suitable bearings of the frame members of the device, substantially as shown. One of the rods 42 is provided with a further extension 48 fixed to the rack extension 45 and terminating at one of the lateral structural members 51 of the frame, substantially as shown. A thrust cable 49 having a pull rod 50, slidably disposed therethrough is fixed at one end to the structural member 51, concentric with the end of the extension 48 while the corresponding end of the pull rod 50 is fixed to the end of extension 48. The other end of the cable 49 is fixed to one arm 52 of a lever 53 while the corresponding end of the pull rod 50 is fixed to the corresponding arm 54 of a similar lever 55. The said levers 53 and 55 are co-fulcrumed at 56, substantially as shown, and are provided with handle portions 57 and 58, which, when grasped by the operator and drawn together, force the pull rod 50 to the left (as seen in Figure 2) with respect to the cable 49, resulting in a movement of the extension 48 to the left, which carries with it the rods 42 against the action of the springs 44. This has the effect of elevating the pins 39 in the slots 40, which in turn elevates the plate 36.

Guide surfaces 59 are provided between the spools 14 and 17 and the plate 35. Also guide rollers 60 are provided which, in cooperative relation with the guide surfaces 59, guide the film between the plates 35 and 36 at an angle optimum for the prevention of any damage to the film. The ends of the plate 35 and the frame 37 are also preferably beveled to further prevent damage to the film, substantially as shown, the beveled surfaces being indicated by the numerals 61 and 62.

In operation, the roll of film to be used is placed on one of the spools 14 or 17, the free end being threaded between the plates 35 and 36, beneath the guide rolls 60, and attached to the other spool. When it is desired to select a particular area of the film for projection, the handles 57 and 58 of the levers 53 and 55 are pressed together, which, as above described, causes the plate 36 to rise with respect to the plate 35. The hand wheel 22 is then rotated until the selected area comes into view. Then the handles 57 and 58 are released which causes the springs 44 to lower the plate 36 on the film, after which the necessary operations with the camera are performed. When it is desired to expose another area of the film, the plate 36 is again elevated in the manner described and the process repeated.

Should it be desired to use cut film of various sizes instead of film in roll form, the same operations are employed with respect to the pressure plate assembly, but it is unnecessary to use the spools 14 and 17.

Having thus described my invention, I claim:

1. A device of the character described comprising a frame adapted to be disposed in the film loading section of a camera, means for holding film spools at the ends of said frame, one spool at each end, a hand wheel rotatably mounted on the frame exterior of loading section of the camera, a rotatably mounted shaft fixed to said hand wheel, a pair of gears rotatably mounted on said shaft, one of said gears being geared to one of said spools, and the other of said gears being geared to the other spool, a clutch for engaging one of said gears to said shaft when said shaft rotates in one direction and for engaging the other of said gears when said shaft is rotated in the opposite direction, a film pressure plate assembly disposed between said spools on said frame, said assembly comprising a fixed lower transparent plate and an elevationally adjustable upper transparent plate, and means for raising and lowering said upper plate.

2. A device of the character described comprising a frame the middle section of which is adapted to be disposed in the film loading section of a camera, means for holding film spools at each end of said frame, means for rotating said spools one at a time and in opposite directions, a film pressure plate assembly disposed at the middle section of said frame, said assembly comprising a fixed lower plate and an elevationally adjustable upper plate, said plates being transparent, stub pins laterally secured to each side of said upper plate, a rod disposed on each side of said plate and longitudinally translatable on said frame, members having inclined slots secured to said rods there being one slot containing member for each stub pin, said stub pins being slidably engaged with said slots, the inclination of said slots being parallel, resiliently yieldable means for urging said rods in one longitudinal direction, and means for urging said rods in the opposite direction against the action of said resiliently yieldable means.

3. A device of the character described comprising a frame the middle section of which is adapted to be disposed in the film loading section of a camera, means for holding film spools at each end of said frame, one spool at each end, a hand wheel rotatably mounted on the frame exterior to the loading section of the camera, a rotatably mounted shaft fixed to said hand wheel, a pair of gears rotatably mounted on said shaft, one of said gears being geared to one of said spools and the other of said gears being geared to the other spool, a clutch for engaging one of said gears to said shaft when said shaft rotates in one direction and for engaging the other of said gears when said shaft is rotated in the opposite direction, a film pressure plate assembly disposed at the middle section of said frame, said assembly comprising a fixed lower plate and an elevationally adjustable upper plate, said plates being transparent, stub pins laterally secured to each side of said upper plate, a rod disposed on each side of said plate and longitudinally translatable with respect to said frame, inclined planes secured to said rods there being one inclined plane for each stub pin, said stub pins being slidably engaged with said inclined planes, the inclination of said inclined planes being parallel, resiliently yieldable means for urging said rods in one longitudinal direction, and means for moving said rods in the opposite direction against the action of said resiliently yieldable means.

MELVIN S. KENNEDY.